United States Patent [19]

Mathis

[11] Patent Number: 4,862,797
[45] Date of Patent: Sep. 5, 1989

[54] PICKUP BALER FOR MAKING PARALLELEPIPEDIC BALES

[75] Inventor: Michel Mathis, Challans, France
[73] Assignee: Hesston S.A., Coex, France
[21] Appl. No.: 215,748
[22] Filed: Jul. 6, 1988

[30] Foreign Application Priority Data

Jul. 9, 1987 [FR] France .................. 87 09778

[51] Int. Cl.⁴ .................................. A01D 39/00
[52] U.S. Cl. .................... 100/189; 100/142; 100/96
[58] Field of Search ............ 100/94, 95, 96, 156, 100/189, 142

[56] References Cited

U.S. PATENT DOCUMENTS

| | | |
|---|---|---|
| 4,034,543 | 7/1977 | Voth et al. |
| 4,075,817 | 2/1978 | Gieske, Jr. .................. 100/215 X |
| 4,157,643 | 6/1979 | White ........................ 100/189 X |
| 4,309,944 | 1/1982 | Frost, Jr. et al. ............ 100/104 |
| 4,343,131 | 8/1982 | McCormick et al. ......... 100/3 X |
| 4,360,997 | 11/1982 | Smith, Jr. .................. 100/255 X |
| 4,552,062 | 11/1985 | Vezzani ..................... 100/95 |
| 4,619,194 | 10/1986 | Pierce ....................... 100/48 X |

FOREIGN PATENT DOCUMENTS

W16863
III/45e 10/1956 Fed. Rep. of Germany.
960938 3/1957 Fed. Rep. of Germany.
2346963 4/1977 France.

Primary Examiner—Stephen Marcus
Assistant Examiner—Christine A. Peterson
Attorney, Agent, or Firm—Hovey, Williams, Timmons & Collins

[57] ABSTRACT

This invention relates to a pickup baler for making parallelepipedic bales of cropped material, comprising a supply mechanism and a precompression channel, opening laterally into a baling chamber in which a baling plunger moves in reciprocating motion, and a feeding device for transferring the material precompressed by the supply mechanism within the precompression channel from this channel up to the baling chamber. The walls of the precompression channel are at least partially made of a material which presents a low surface tension with respect to water, or are coated with such a material.

11 Claims, 1 Drawing Sheet

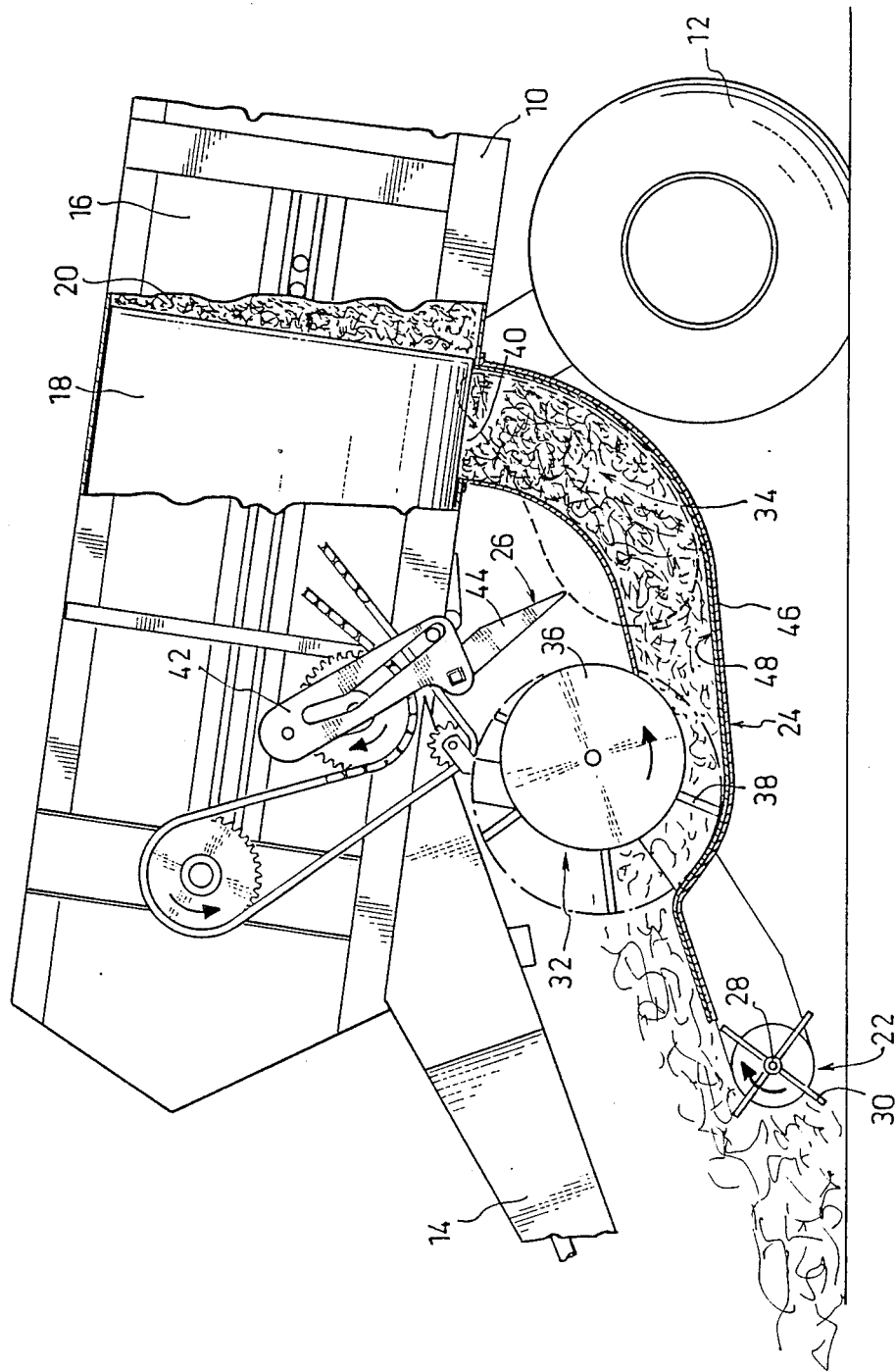

PICKUP BALER FOR MAKING PARALLELEPIPEDIC BALES

FIELD OF THE INVENTION

The present invention relates to a pickup baler for making parallelepipedic bales of crop material, as described for example in U.S. Pat. No. 4,132,164 granted on Jan. 2, 1979 to WHITE, the contents of which is incorporated herein by reference.

BACKGROUND OF THE INVENTION

Without repeating in detail the description of the machine of the White Patent, it will be recalled here that the fodder is gathered up from the ground by a lifting cylinder or pickup, then introduced and precompressed within a precompression channel opening out laterally into a baling chamber where a baling plunger moves in reciprocating motion.

When the baling plunger moves back, a feeding mechanism transfers the charge present in the precompression channel into the baling chamber. The transfer time corresponds to the short return time of the piston, with the result that the feeding mechanism operates at high speed.

The feeding mechanism conventionally comprises a series of fingers which penetrate slots extending over the length of the precompression channel and sweep this channel under the action of an eccentric drive.

The efforts developed in this mechanism reach a maximum when the feeding fingers penetrate the precompression channel and begin to push the charge.

Consequently, when the resistance exerted by the charge exceeds a critical value, the efforts in the feeding mechanism exceed the threshold of rupture of an element designed as sacrificial element in order to preserve the integrity of the rest of the mechanism.

Of course, the resistance exerted by the charge depends in the first place on the rate of precompression attained in the precompression channel. However, it has been ascertained that this resistance increases sharply when the rate of hygrometry of the cropped material increases beyond a certain threshold, without the causes of such a sharp increase being clearly elucidated.

In a first analysis, the fact of exceeding a certain threshold of hygrometry results in a coalescence or packing of the cropped material, as well as adhesion thereof against the walls of the precompression channel.

SUMMARY OF THE INVENTION

According to the present invention, the walls of the precompression channel are at least partially made of a material which presents a low surface tension with respect to water, or are coated with such a material.

Thanks to the invention, the effect of adhesion of the cropped material against the walls of the precompression channel will be considerably reduced, as well, consequently, as the resistance exerted by the charge on the feeding mechanism during transfer of the charge towards the baling chamber, thus overcoming the drawbacks of the prior art.

It may therefore be envisaged to use the pickup baler under circumstances considered heretofore as impossible, such as for example the gathering of grass at nightfall when its hygrometry rises suddenly, the gathering of grass in regions with a very humid climate, or the gathering of humid grass (half-dried) specifically intended for ensilage.

Among the possible materials for making or coating the walls of the precompression channel, materials will be chosen which preserve a good resistance to abrasion, such as for example polyamides (nylon) of high molecular mass or polyethylenes. Composite materials may also be chosen which comprise coated glass fibers in a matrix of plastics material. According to the invention, a metallic material may also be chosen having received a special surface treatment or an application of special paint or lacquer.

Among the walls of the precompression channel, the teachings of the invention will be applied in priority to the concave wall located opposite the feeding fingers insofar as the friction of the cropped materials against this wall has a preponderant effect.

BRIEF DESCRIPTION OF THE DRAWINGS

The invention will be more readily understood on reading the following description with reference to the sole FIGURE of the accompanying drawings, which is a view in longitudinal section of a pickup baler incorporating an improvement according to the present invention.

DETAILED DESCRIPTION OF THE DRAWINGS

The machine is essentially constituted in accordance with U.S. Pat. No. 4,132,164 to which reference is made for further details.

It comprises a chassis 10 borne by wheels 12 and extended by a front drawbar 14 by which it may be towed by a tractor vehicle and connected to a power take-off shaft thereof. For sake of clarity, neither the tractor vehicle nor its power take off shaft have been shown in the drawing.

In the upper part of the chassis there is constituted a parallelepipedic baling chamber 16 in which moves a plunger 18 in reciprocating motion in order to compress the fodder in the form of parallelepipedic bales 20 which are then evacuated via the rear end of the machine, towards the right in the FIGURE.

Beneath the chassis 10 are fixed a certain number of devices for gathering the cropped material from the ground and for conducting it to the baling chamber 16.

When considering the direction of the path of the cropped material, these devices comprise successively:
a pickup device 22,
a precompression device 24, and
a feeding mechanism 26.

The pickup device 22 comprises a shaft 28 provided with a plurality of radial rods 30 and driven in rotation in clockwise direction. It is maintained at a short distance above the ground, so that, when the machine is moving, i.e. towards the left in the FIGURE, it lifts the material, previously cropped and windowed, above the ground and directs it towards the rear in the direction of the precompression device 24.

The latter comprises a supply mechanism 32 and a precompression channel 34.

The supply mechanism comprises a cylinder 36 placed immediately above the inlet of the precompression channel 34, driven in rotation in anticlockwise direction, and bearing supply fingers 38 which project over a variable distance from the cylinder 36 so that the fingers are in maximum extension on the pickup device 22 side and in complete retraction on the precompression channel 34 side.

The precompression channel forms a substantially quarter-circle bend and terminates in an outlet 40 in the lower face of the balin chamber. The kinematics of the baling plunger are such that the plunger closes the outlet 40 during its forward strokes in the chamber and uncovers this outlet at the end of its return strokes.

The role of the supply mechanism 32 is therefore progressively to force the cropped material into the precompression channel 24 and to constitute therein a charge of precompressed material which is packed progressively against the baling plunger, which serves as stop to that end.

Finally, the feeding mechanism 26 comprises arms 42 bearing fingers 44 and driven by a drive device which imparts to the arms a complex movement indicated in broken lines at the figure in synchronism with the reciprocating strokes of the plunger 18, as described in detail in U.S. Pat. No. 4,132,164 mentioned hereinabove.

Schematically, this movement includes an active section during which the fingers 44 first penetrate the channel, near the base thereof, passing through longitudinal slots extending over the whole length of the upper wall of the channel, and thereafter the fingers sweep the channel on rising therealong, to push the precompressed charge into the baling chamber through the outlet 40 whilst the latter is uncovered since the plunger 18 is in its retracted position.

The movement of the arms then includes an inactive return section during which the fingers leave the precompression channel in the vicinity of its outlet, then swing downwardly, outside the channel and as far as the base thereof.

The active movement of the arms is effected in a very short time and it will be observed that the efforts coming into play reach a maximum value at the beginning of this active movement when the fingers penetrate the channel and begin their ascending sweeping movement. In fact, the ratio between the resistant lever arm and the driving lever arm on the arms of the mechanism is at that moment the highest.

As indicated in the preamble, any increase in the resistance that the precompressed charge exerts against its transfer towards the baling chamber may lead to deteriorations of the drive elements, which are usually avoided by providing in the kinematic chain an element of least resistance or sacrificial element of which the rupture protects the other elements. For sake of clarity, the sacrificial element is not shown on the drawing.

According to the invention, the walls of the precompression channel are at least partially made of a material presenting a low surface tension with respect to water.

According to the basic embodiment illustrated in the Figure, the walls of the precompression channel are made of sheet metal and the concave wall 46 located opposite the feeding fingers 44 is coated with a plate 48 of a material as defined above.

Thanks to this arrangement, the friction forces between the humid cropped material and the concave wall 46 of the channel will be considerably reduced, as well, consequently, as the efforts coming into play in the drive of the feeding device.

This embodiment can easily be adapted to all machines, both during manufacture and during subsequent re-fitting, without necessitating long immobilization of the machine.

From this basic embodiment, numerous variants of the invention can be envisaged. A few variants are listed hereafter, without it being necessary to illustrate them:
   coating of all the walls of the precompression channel, and, as a general rule, of all the walls or members of the machine in contact with the cropped material: pickup device and baling chamber in particular
   manufacture of the walls of the precompression channel integrally in a material having the properties set forth hereinabove, with or without complementary stiffening depending on the rigidity of the material;
   the material in question may consist of a composite formed by plastics material reinforced with glass fibers or in general high-strength fibers;
   a preferred material is polyamide (nylon);
   the coating may be applied on the walls in the form of paint, lacquer or in the form of a special surface treatment.

What is claimed is:

1. In a pickup baler for making parallelepipedic bales of cropped material, comprising a supply mechanism and a precompression channel, opening laterally into a baling chamber in which a baling plunger moves in reciprocating motion, and a feeding device for transferring the material precompressed by the supply mechanism within the precompression channel from this channel up to the baling chamber, the improvement wherein the walls of the precompression channel are at least partially made of a material which presents a low surface tension with respect to water.

2. The improvement of claim 1, wherein said material is a polyamide of high molecular mass.

3. The improvement of claim 1, wherein said material is polyethylene.

4. The improvement of claim 1, wherein said material is a composite comprising a matrix of plastic material reinforced with high-strength fibers.

5. The improvement of any one of claims 1 to 4, wherein the precompression channel has a wall of concave shape opposite the feeding device and only this wall is made of such a material.

6. In a pickup baler for making parallelepipedic bales of cropped material, comprising a supply mechanism and a precompression channel, opening laterally into a baling chamber in which a baling plunger moves in reciprocating motion, and a feeding device for transferring the material precompressed by the supply mechanism within the precompression channel from this channel up to the baling chamber, the improvement wherein the walls of the precompression channel are at least partially coated with a material which presents a low surface tension with respect to water.

7. The improvement of claim 6, wherein said material is a polyamide of high molecular mass.

8. The improvement of claim 6, wherein said material is polyethylene.

9. The improvement of claim 6, wherein the walls of the precompression channel are made of sheet metal and said material is applied on said walls by using one of the following methods: paint, lacquer and surface treatment.

10. The improvement of any one of claims 6 to 9, wherein the precompression channel has a wall of concave shape opposite the feeding device and only this wall is coated with such a material.

11. The improvement of claim 6, wherein the baler comprise coatings of such a material over all or part of its other walls or elements intended to be in contact with the cropped material.

* * * * *